United States Patent [19]

Parks

[11] 4,027,892
[45] June 7, 1977

[54] CARGO RESTRAINING ASSEMBLY FOR USE IN A VEHICLE

[76] Inventor: James R. Parks, 9380 W. Loomis Road, Franklin, Wis. 53132

[22] Filed: Oct. 28, 1975

[21] Appl. No.: 626,265

[52] U.S. Cl. .......................... 280/179 R; 248/220.4
[51] Int. Cl.² ........................................... B60P 7/10
[58] Field of Search ............... 280/179 R; 296/1 F; 248/DIG. 3, 346; 52/590

[56] References Cited

UNITED STATES PATENTS

| | | | |
|---|---|---|---|
| 708,470 | 9/1902 | Flood | 52/590 |
| 1,665,439 | 4/1928 | Brown | 280/179 R |
| 2,621,807 | 12/1952 | Rendich | 248/DIG. 3 |
| 3,508,764 | 4/1970 | Dobson | 280/179 R |
| 3,560,022 | 2/1971 | Gold | 280/179 R |

*Primary Examiner*—Robert R. Song
*Attorney, Agent, or Firm*—James E. Nilles

[57] ABSTRACT

Apparatus for use in vehicles for preventing the shifting of cargo transported therein. The apparatus includes a platform such as a wooden pegboard which can be received on the floor of the cargo area of a vehicle such as a van or pickup truck. The platform includes a plurality of bores therein arranged in a grid pattern for receiving removable pegs. The platform is constructed from several interlocking flat sections which are laid side-by-side and which can be easily disassembled to permit removal of the platform from the vehicle. The periphery of the platform is shaped to have a contour very similar to the contour of the periphery of the floor of the cargo area of the vehicle. The contour of the platform is designed to prevent it from shifting and to secure it in place in the vehicle. The pegs, receivable in the bores in the platform, can be positioned around cargo to prevent it from shifting horizontally or can be provided with eyelets to permit the cargo to be tied down. The pegs can also comprise projections extending downwardly from cargo supporting racks wherein the projections function to prohibit movement of the racks.

10 Claims, 15 Drawing Figures

CARGO RESTRAINING ASSEMBLY FOR USE IN A VEHICLE

BACKGROUND OF THE INVENTION

The present invention relates to apparatus for preventing sliding or shifting of cargo being transported in a vehicle. More specifically, the invention is directed to a multi-component platform for use on the the floor of the vehicle such as a pickup truck or van to support loads therein and to prevent cargo transported therein from shifting.

When loads are transported in vans or pickup trucks, it is not uncommon for the loads to shift during acceleration, stopping or cornering of the vehicle. Depending on the type of load invloved such shifting can cause damage to the load itself, damage to the vehicle or both. When heavy cargo is being transported such shifting can cause structural damage to the vehicle and in the case of vans, shifting of such loads in the event of sudden stops can also result in injury to the driver.

SUMMARY OF THE INVENTION

The object of the present invention is to provide a means for securing cargo which is being transported in a vehicle such as a van or pickup truck and to prevent shifting of that cargo. A futher object of the invention is to provide such a securing means which can be used with a variety of vehicles and which is readily adaptable to receive a large variety of cargo types having any number of different shapes and sizes. The securing means is also disigned to be easily removable from the vehicle such that the vehicle is not encumbered by the securing means when cargo is not being transported.

The present invention includes a flat platform which is receivable on the bed of the vehicle and which includes a plurality of bores therein forming a pegboard or grid configuration. The bores in the platform are designed to receive securing pegs which prevent movement or shifting of the cargo. As an example, cargo may be placed on the platform and simple cylindrical pegs may be placed in the bores to surround the cargo thereby preventing the cargo from sliding relative to the platform. In the event the cargo does not have a shape commensurate with the grid pattern in the platform, a pair of wedges can be forced between the pegs and the cargo to rigidly secure the cargo. The pegs used to support cargo in this manner can have any variety of shapes depending upon the type of cargo being transported and can include means such that they can be locked into the bores in the platform. Such pegs can also include eye bolts capable of receiving straps or ropes such that cargo can be tied down. Other types of cargo supporting means can also be provided for use in conjunction with the bored platform. For example, plates which have cylindrical projections extending from their bottom surface can be used, wherein the projections are received in the bores and the plates are used to support a variety of types of supporting brackets. Supporting brackets of a wide variety of shapes can be used to hold pipe, lumber, sheet stock glass, oil drums, flower pots, etc.

The platform may be comprised of a plurality of separable sections which include interlocking complimentary dovetailed projections and notches such that the boards or plates can be secured in assembled relationship when laid on the bed of the vehicle but can be readily removed from the vehicle by disassembly. The periphery of the platform is shaped to approximate the inside periphery of the vehicle such that the platform itself is not shiftable within the vehicle.

The predominant advantage of the present invention is that it provides an inexpensive means for protecting the vehicle, the load and the passengers in the vehicle from damage caused by shifting of loads carried in the vehicle. The platform can be easily placed in the vehicle or removed, is inexpensive and will receive a wide variety of supporting means. The structure of the invention also permits the cargo supporting means used, to be particularly adapted to the primary use of the vehicle.

The following description of the preferred embodiments illustrates several embodiments of the invention for use with a vehicle such as a van or a pickup truck. The embodiments described, however, should not be viewed as limiting the scope of the invention and it should be readily apparent that the apparatus of the invention can include a wide variety of alternative elements. Futhermore, the invention is not limited to use with vehicles such as vans and pickup trucks but could be used with any of a wide variety of vehicles.

DESCRIPTION OF THE PREFERRED EMBODIMENT

Figure 1:
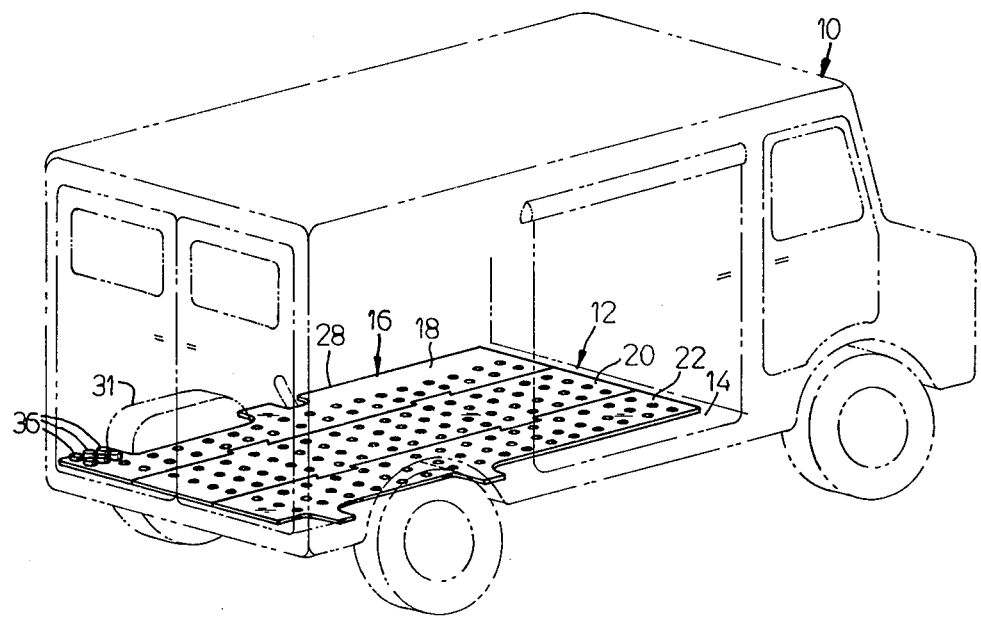
FIG. 1 is an isometric view of the platform of the present invention positioned in a van.
Figure 2:
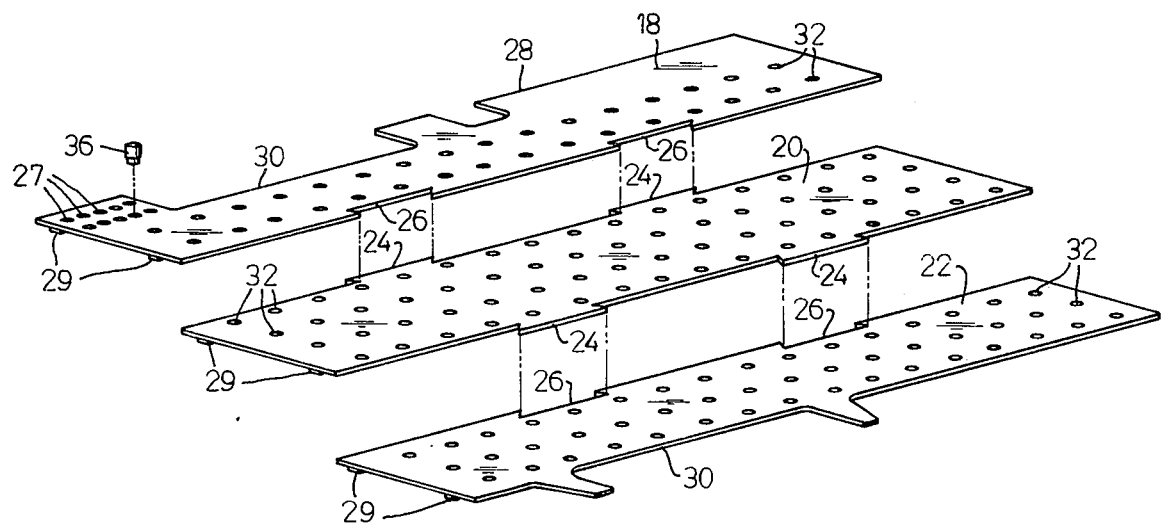
FIG 2 is an exploded isometric view of the platform of the present invention.
Figure 3:
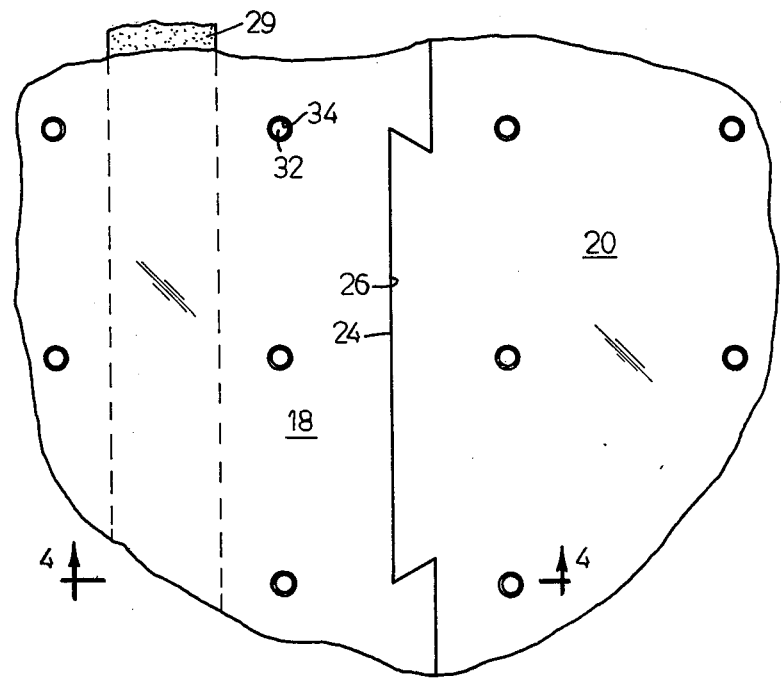
FIG. 3 is a detailed plan view of a portion of the platform.

The present invention is designed to be used in a vehicle such as the truck 10, shown in FIG. 1, which has a cargo receiving area 12 with a floor 14. The invention includes a platform 16 which defines a pegboard like arrangement and which is comprised of a plurality of spaced sections 18, 20 and 22. The sections 18, 20 and 22 are each received in interlocking side-by-side relationship in such a manner in that they are secured together and supported by the floor 14. The sections 18, 20 and 22 are connected in interlocking relationship, as best shown in FIGS. 2 and 3, by a plurality of dovetailed projections 24 extending laterally outwardly from the sides of section 20 and received in complementary dovetailed notches 26 in the adjacent sides of sections 18 and 22.

The platform 16 is shown as being constructed from wood and more specifically from ⅝ inch thick waterproof particle board. Of course, the platform may be constructed from any other suitable material such as aluminum or steel plate.

The periphery 28 of the platform 16 defines a contour which is substantially equal to the periphery of the floor 14. The periphery 28 includes a pair of opposed large notches 30 which are included to receive the inwardly projecting tire wells 31 of the vehicle. The shape of the periphery of the platform 16 is particularly adapted for use with a particular vehicle, whereby the relatively close fit of the platform 16 within the cargo area 12 of the vehicle 10 prevents any sliding movement of the platform 16 within the vehicle.

Figure 4:
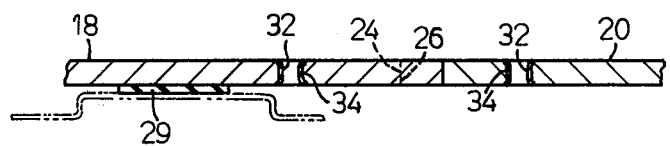
FIG. 4 is a cross-sectional view taken along the line 4—4 in FIG. 3.
Figure 5:
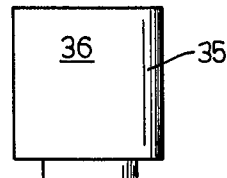
FIG. 5 is an enlarged cross-sectional view of the bores shown in FIG. 4 and further showing a peg receivable within the bores.

The platform 16 is provided with a plurality of spaced bores 32 which are located on, for example, 6 inch centers to form a grid or pegboard like pattern. As shown in FIGS. 3–5, each bore 32 extends through the platform and includes a steel sleeve 34 located therein. The sleeves 34 are force fitted into the bores in such a manner that they are tightly received therein. The sleeve 34 may include a lip around its lower periphery and be crimped around its upper periphery in order to secure it within bores 32. Strips of relatively thin foam backing material 29 are secured to the lower surface of the platform 16 in order to reduce the vibration of the platform with respect to the floor 14 and in order to reduce the noise incident to such vibration.

Figure 6:
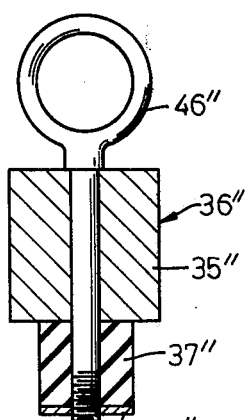
FIG. 6 is a partial cross-sectional view showing a second embodiment of the peg shown in FIG. 5.
Figure 7:
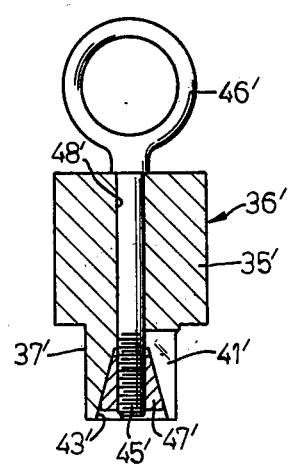
FIG. 7 is a cross-sectional view showing a third embodiment of the peg shown in FIG. 5.

The pins or pegs 36 which are best shown in FIGS. 5–7, may have any of a variety of suitable shapes and attachments as will be set forth hereafter. The peg shown in FIG. 5, includes a generally cylindrical upper portion 35 having a relatively large diameter and a smaller diameter lower cylindrical portion 37 which is received in mating engagement in the bore 32. The pegs are generally constructed from a metallic material so as to be rigid and the lower portion 37 has a diameter substantially equal to the inside diameter of the sleeve 34 such that the pegs 36 fit relatively securely within the sleeve. The platform 16 is also provided with a plurality of closely spaced bores 27, shown in FIGS. 1 and 2 to facilitate convenient storage of the pegs 36 when they are not in use.

Figure 8:
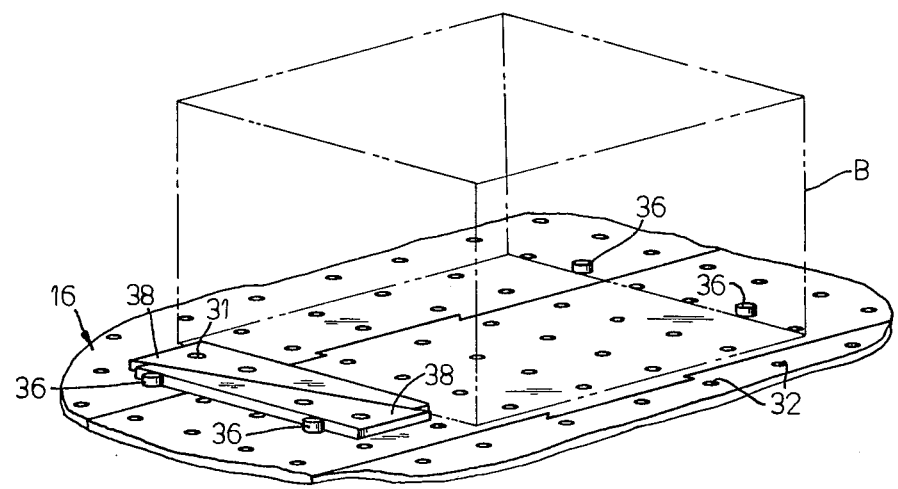
FIG. 8 is an isometric view illustrating means of the present invention for securing cargo.

When cargo, such as box B shown in FIG. 8 is placed in the vehicle, a plurality of pegs 36 can be placed around the cargo in the bores 32. If necessary, a pair of wedges 38 can then be forced between the pegs 36 and the box B in the manner shown such that the box B is firmly secured between the pegs and is prevented from sliding movement within the vehicle. Wedges can also be used on two sides of the box B rather than on just one side as shown in FIG. 8. Of course, if the cargo is of a size commensurate with the spacings of the bores 32, it may be necesary only to place the pegs 36 in the bores 32 to secure the cargo and the wedges 38 would be unnecessary. The wedges 38 can also include bores 31 extending therethrough for receiving the upper portion 35 of the pegs in order to secure the wedges in place with respect to the platform 16.

Figure 14:
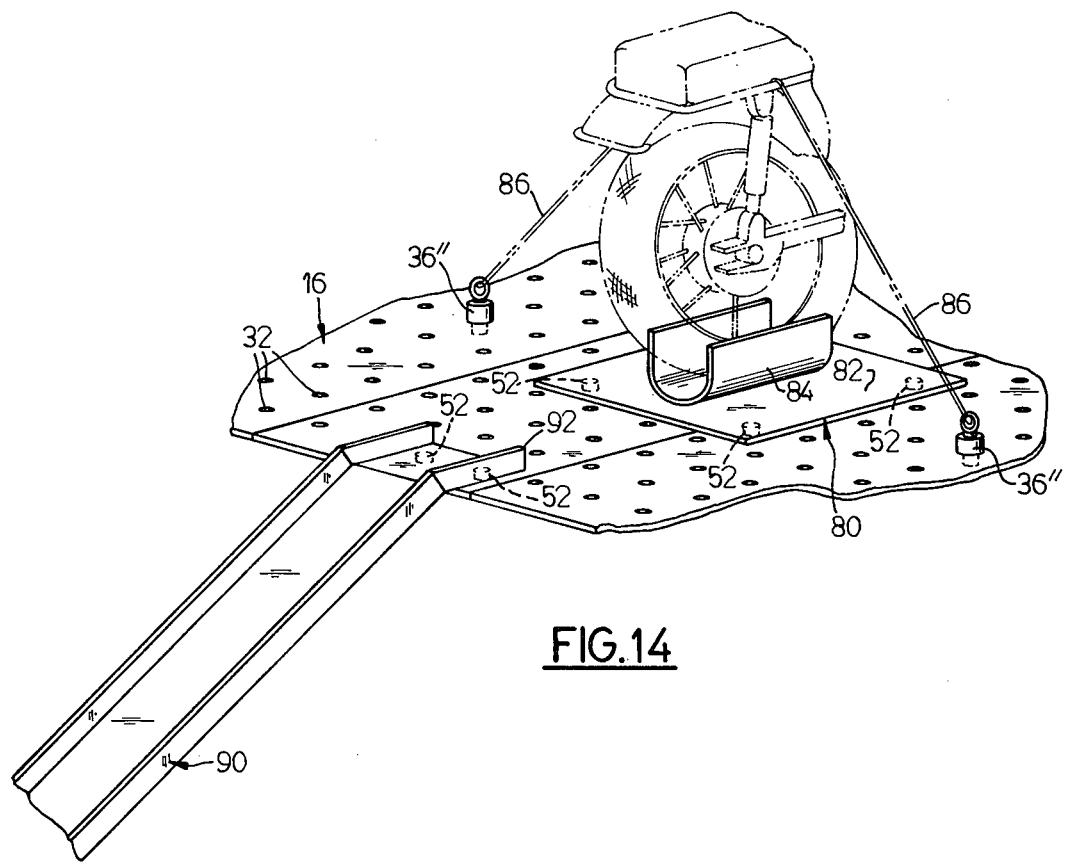

Use of pegs 36 such as those described is generally most desirable where the cargo has a relatively low center of gravity such that if the cargo shifted it would tend to slide along the platform rather than turn over. On the other hand, if the cargo is of the type which could tip over, an alternative type of pegs should be used. Two such alternative embodiments of the pegs 36 are shown in FIGS. 6–7. The pegs 36', shown in FIG. 7, are illustrated as including a cylindrical upper portion 35' and a smaller cylindrical lower portion 37' which is received within the bores 32. The lower portion 37' is a split in a longitudinal direction along the line 41' such that it can expand or contract in diameter and further includes a tapered bore 43' therein. The peg 36' is provided with an axially extending central bore 48' capable of receiving an eyebolt 46' therethrough. The eyebolt 46' includes a threaded lower portion 45' threadably received in a tapered member 47' which is in turn receivable within the tapered bore 43'. The eyebolt 46' can cause the tapered member 47' to be pulled into the tapered bore 43' to cause expansion of the lower portion such that it may be locked in the bore 32. The eyebolt 46' may then receive ropes or other securing means which can be used to hold cargo and prevent it from shifting. For example, a plurality of such pegs can be spaced around cargo such as the motocycle, as shown in FIG. 14, and lines which extend over the cargo can be secured to these pegs. FIG. 6 illustrates another embodiment of the pegs 36 which can be used to secure cargo. The peg 36" shown therein includes a lower cylindrical portion 37" and a threaded eyebolt 46" which is received within a concentric bore 48" extending through and co-axial with the peg 36". The lower portion 37" is comprised of resilient material such as rubber and is receivable within the bores 32. A metal washer 43" having a threaded bore therein is secured to the lower surface of the resilient lower portion 37" and receives the threaded eyebolt 46". When the peg 36" is inserted into the bore, the eyebolt 46" can be tightened to cause radial expansion of the resilient portion 37" such that the peg 36" is securely received within the bore 32.

Figure 9:
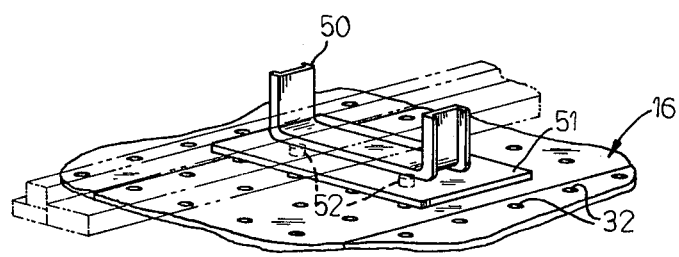
FIGS. 9-15 are isometric views illustrating alternative embodiments of the present invention for securing various other types of cargo.

FIG. 9 illustrates an alternative embodiment of the cargo securing means of the present invention wherein bracket means 50 are provided to support elongated items such as lumber and to prevent shifting movement of such items in the vehicle. More specifically, the supporting structure shown in FIG. 9 includes a plate 51 which is received in flat engagement with the platform 16, the plate 51 having a plurality of downwardly extending pegs 52 integrally connected to and projecting from its lower surface. The pegs 52 are properly spaced so as to be receivable within the spaced bores 32 such that the pegs can prevent sliding movement of the plate 51 with respect to the platform 16. The upper surface of the plate 51 rigidly supports the angular bracket 50. The angular bracket 50 is provided with a pair of upwardly extending arms for receiving lumber therebetween. As an alternative embodiment of that shown in FIG. 9, it would also be possible to merely provide the angular bracket member 50 with downwardly extending pegs 52 in such a manner that the angular bracket could be directly supported by the platform 16.

Figure 10:
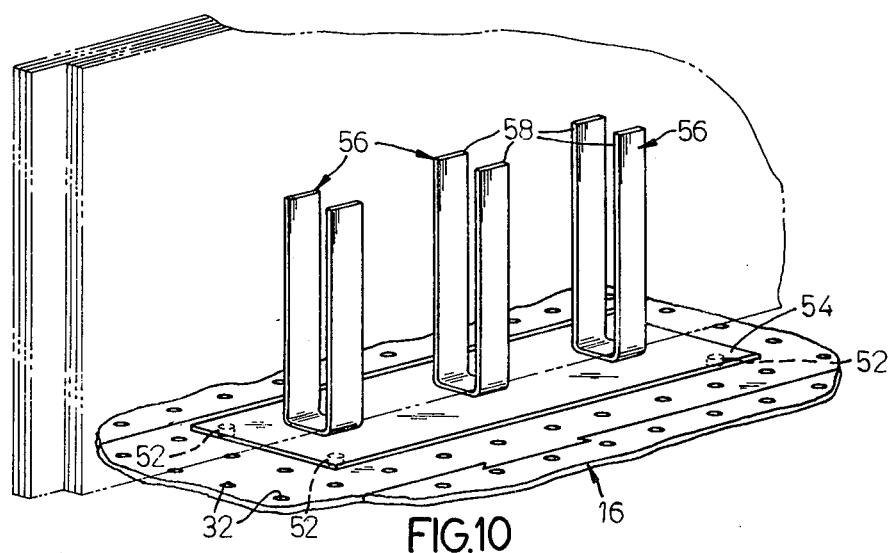

FIG. 10 illustrates another embodiment of the invention analogous to that shown in FIG. 9 but designed to support sheets of meterial in a vertically positioned relationship. A flat supporting plate 54 is provided having a plurality of downwardly extendig pegs 52 secured to its lower surface and receivable in bores 32 in the platform 16. A plurality of elongated upwardly extending brackets 56 are rigidly secured to the plate 54 and include arms 58 capable of supporting sheet material in a vertically extending position.

Figure 11:
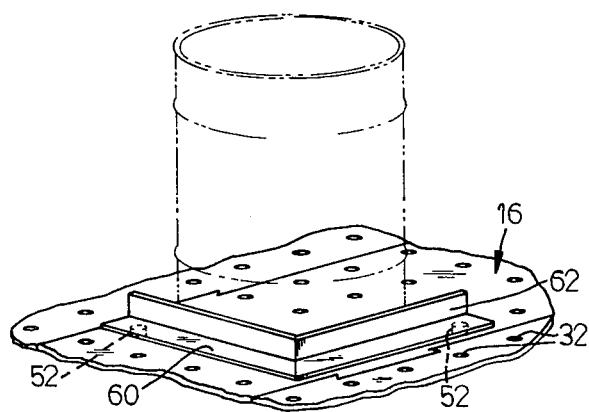

FIG. 11 illustrates another alternative embodiment of the invention wherein a cargo securing means is positioned to support a cylindrical drum and prevent sliding movement of said drum. The cargo supporting means shown in FIG. 11, includes a flat supporting plate 60 which includes a pair of downwardly extending pegs 52 projecting from its lower surface and spaced so as to be receivable in bores 32 in the platform 16. The plate 60 has an L-shaped configuration and supports an angular drum supporting bracket 62. The supporting bracket 62 rigidly connected to the inside surface of the L-shaped plate 60 and extends vertically therefrom to prevent sliding movement of said drum. The angular bracket 62 defines a right angle such that it abuts the drum on two sides and is thus capable of preventing movement of the drum in two directions. However, if necessary, a second such support means can be placed on the opposite side of said drum to secure the drum against movement in all directions.

Figure 12:
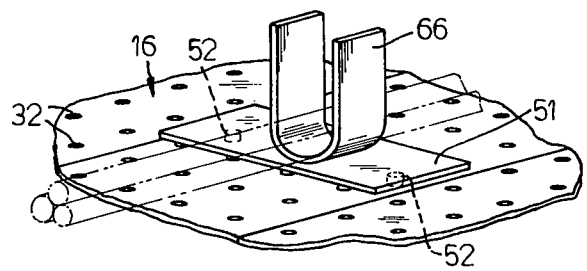

FIG. 12 shows an embodiment of the invention closely analogous to that shown in FIG. 9 but wherein a U-shaped bracket means 66 is positioned for supporting the ends of such items as pipe or other elongated cylindrical objects. The U-shaped bracket 66 is supported by a flat supporting plate 51 in the same manner that the bracket 66 is supported from the plate 51, and the plate 51 is prevented from sliding movement with respect to platform 16 by a pair of downwardly extending pegs 52.

Figure 13:
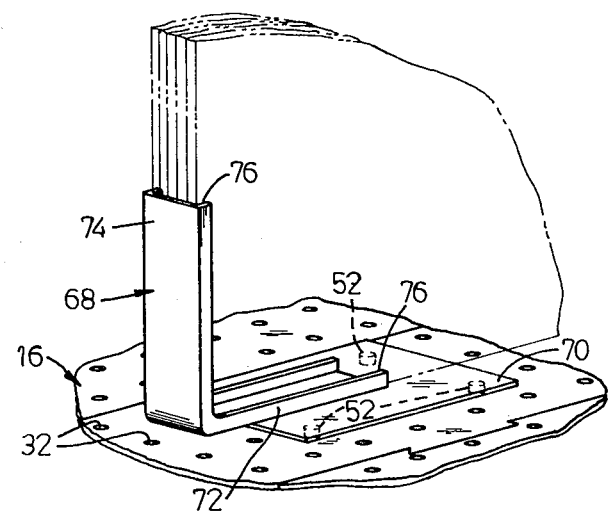

FIG. 13 illustrates yet another embodiment of means for supporting sheet material in a vertically extending position. An L-shaped bracket 68 is rigidly secured to a flat supporting plate 70 which is in turn secured against movement with respect to the platform 16 by a plurality of spaced downwardly projecting pegs 52 received in bores 32. The L-shaped bracket 68 is secured to the plate 70 in such a manner that the base 72 of the L-shaped bracket is cantilevered to extend beyond the edge of the plate 70 and the vertically extending portion 74 of the bracket is integral with the outwardly extending end of the bracket. The peripheral edges of the L-shaped bracket 68 include channels 76 for receiving sheet material therebetween. The bracket 68 also has a possible alternative function in that the vertically extending portion 74 could be placed in abutment against cargo, such as large boxes, etc., to prevent movement of such cargo.

Additional embodiments of the invention can also be provided as supporting structures for holding specific goods therein or for supporting particular types of cargo. For example, FIG. 14 illustrates a motorcycle mounting rack 80, comprising a flat supporting plate 82 and a rigidly attached elongated U-shaped bracket 84, which further includes a plurality of downward extending spaced pegs 52 projecting from its lower surface and receivable in the spaced bores 32 in the platform 16. The mounting rack 80 is thus secured in the van or pickup truck against shifting or sliding movement. The motorcycle can be tied down using ropes 86 or straps received in pegs 36' or 36" to prevent any movement of the motorcycle during transportation.

FIG. 14 also illustrates the use of a ramp 90 for loading a motorcycle into a van or pickup, wherein the end 92 of the ramp 90 extending into the van or pickup truck is provided with a plurality of spaced projections 52 extending downwardly and receivable in the bores in the platform. The platform thus facilitates stabilization of the ramp during the loading process.

Figure 15:
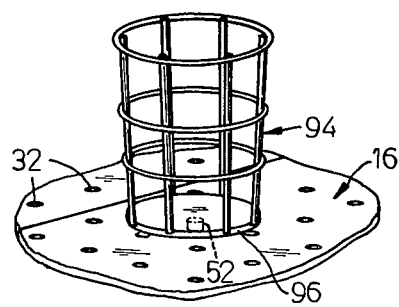

FIG. 15 illustrates one more additional embodiment of the invention wherein a basket 94 is secured to the plate 16 by means of a peg 52 rigidly secured to the basket bottom plate 96. Baskets or buckets of this type are particularly useful, for example, for florists wherein flower pots may be supported in the baskets during transit.

Resume

The cargo restraining assembly of the present invention thus provides a means to secure cargo in a vehicle which is readily adaptable to receive and to support any of a large number of types of cargo. The restraining assembly also includes a platform which is easily removable from the vehicle but when in place, is secured such that is does not slide with respect to the cargo floor of the vehicle and also includes means which substantially reduce any vibration of the platform. The assembly is relatively inexpensive and uncomplicated yet it effectively protects the vehicle, the load and the passengers from any damage it might be caused due to shifting or overturning of the cargo.

I claim:

1. A cargo restraining assembly for use in vehicles for preventing shifting of cargo transported in said vehicles, said cargo restraining assembly comprising a platform means receivable on a cargo supporting surface of said vehicle for use in supporting cargo, said platform means having spaced bore therein, peg means receivable in said bores, and supporting plate means for restraining cargo supported by said platform means said supporting plate means being secured in position on said platform means by said peg means.

2. The cargo restraining assembly set forth in claim 1 wherein said peg means include a lower end receivable in said bores and an upper end projecting above said platform and wherein said supporting plate means comprise wedges received between said upper end and said cargo to secure said cargo against horizontal sliding movement with respect to said platform.

3. The cargo restraining assembly set forth in claim 1 wherein said peg means are attached to and extend downwardly from said supporting plates for securely positioning said plates on said platform when said peg means are received in said bores.

4. The cargo restraining assembly set forth in claim 3 wherein said supporting plate means include U-shaped bracket means rigidly secured to its upper surface and extending upwardly therefrom for receiving and supporting cargo therein.

5. The cargo restraining assembly set forth in claim 3 wherein said supporting plate means include angular bracket means rigidly secured to its upper surface and extending upwardly therefrom to supporting cargo therein.

6. A cargo restraining assembly for use in vehicles for preventing shifting of cargo transported in said vehicles, said cargo restraining assembly comprising: a platform means receivable on a cargo supporting surface of said vehicle for use in supporting cargo, said platform means having a plurality of spaced bores therein and having a contoured periphery shaped substantially to complement the periphery of said cargo supporting surface whereby said platform means can be securely received within said vehicle against sliding movement thereof; peg means receivable in said bores; and supporting plate means for restraining cargo supported by said platform means; said supporting plate means being secured in position on said platform means by said peg means.

7. The cargo restraining assembly set forth in claim 6 wherein said peg means include a lower end receivable in said bores and an upper end projecting above said platform means and wherein said supporting plate means comprise wedges received between said upper end and said cargo to secure said cargo against horizontal sliding movement with respect to said platform means.

8. A cargo restraining asembly for use in veicles for preventing shifting of cargo transported in said vehicles, said cargo restraining assembly comprising a platform means receivable on a cargo supporting surface of said vehicle for use in supporting cargo, said platform means including interconnecting removable sections having spaced bores therein, peg means receivable in said bores for preventing shifting of said cargo with respect to said platform means when said peg means are positioned in said bores and engaging said cargo, and said platform means having a contoured periphery shaped substantially to complement the periphery of said cargo supporting surface whereby said platform means can be securely received within said vehicle against sliding movement thereof.

9. The cargo restraining assembly set forth in claim 8 wherein at least some of said peg means include an expandable lower section receivable within said bores and further include an upper section threadably receivable within said lower section for causing expansion thereof whereby peg means may be secured in said bores.

10. The cargo restraining assembly set forth in claim 9 wherein said upper section comprising an eye bolt.

* * * * *